1,121,101. Patented Dec. 15, 1914.

UNITED STATES PATENT OFFICE.

FREDERICK C. HERSEE, OF BOSTON, MASSACHUSETTS.

WHEEL-PULLER.

1,121,101.

Specification of Letters Patent. Patented Dec. 15, 1914.

Application filed August 28, 1914. Serial No. 859,137.

*To all whom it may concern:*

Be it known that I, FREDERICK C. HERSEE, a citizen of the United States, and a resident of Boston, in the county of Suffolk and State of Massachusetts, have invented certain new and useful Improvements in Wheel-Pullers, of which the following is a specification.

This invention relates to certain improvements in devices for use in removing wheels, cams, fly wheels or other rotors from the end of a shaft, axle, spindle or the like, and more particularly to that type in which two members are employed, one of said members being adapted to engage with the rotor and the other to engage with the axle or other support. In ordinary practice these two members have threaded engagement with each other and are relatively rotatable about an axis in alinement with the axis of the wheel and support. With the device properly in place, a relative rotation of the members will produce a steady strain tending to slowly pull the wheel endwise off of the axle. It often happens that the contacting surfaces have rusted or have become so tightly wedged or stuck that this gradual strain is of very little effect in securing the desired axial movement.

The main object of my invention is to provide means in combination with said relatively rotatable members for jarring or tapping the parts and thus tend to break the rust or loosen the wheel so that it may be more easily removed by the gradual and steady strain resulting from the aforesaid relative rotation of the members.

In carrying out my invention, I provide a slidable member preferably in the form of a floating pin coaxial with the other two members and having an axial movement in respect thereto. This pin is preferably so mounted as to engage with the end of the axle so that blows delivered to the outer end of the pin will be communicated directly to said axle. By mounting the pin within one of the two members so as to be carried by the latter, it will be in proper position for use irrespective of such variation in axial position as may be effected by the relative rotation of the two main parts.

Reference is to be had to the accompanying drawings in which I have illustrated one practical and satisfactory embodiment of my invention but, as various changes may be made within the scope of the appended claims without departing from the spirit of my invention, I desire the drawings to be considered in an illustrative rather than in a limiting sense.

Figure 1:
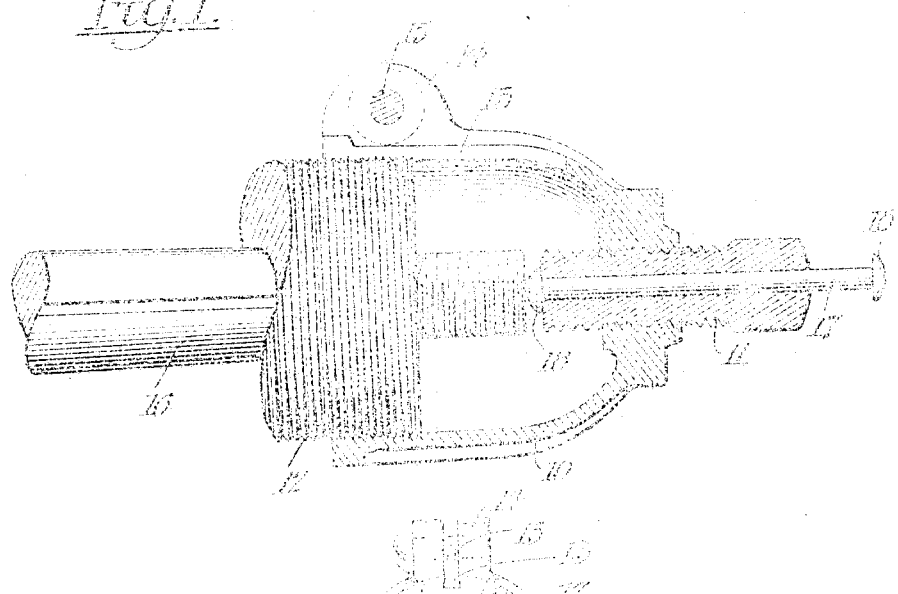
Figure 2:
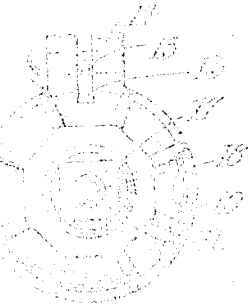
Figure 3:
Figure 4:

In these drawings: Figure 1, is a longitudinal section through a portion of a wheel puller constructed in accordance with my invention and a portion of a wheel and axle. Fig. 2, is an end view of the device shown in Fig. 1. Fig. 3, is a longitudinal section through a slightly modified form of screw and floating pin and, Fig. 4, is a section similar to Fig. 3, but showing a further modification.

In the specific embodiment illustrated in the accompanying drawings, the two main members of the device comprise a cap 10, and a screw 11, the latter extending through the end wall of the cap and having threaded engagement therewith. The specific construction of these two members does not form the important portion of my present invention, as it is evident that they may be varied widely within the scope of my claims. As shown, the cap 10, is interiorly threaded at its open end so as to screw on to the hub 12 of a wheel, and is provided with a slot 13, extending lengthwise thereof. Lugs 14 upon opposite sides of the slot are connected by a screw 15 so that by drawing the two lugs together, the interior diameter of the cap may be slightly reduced or the cap may be more effectively gripped on the hub after having been screwed onto the latter. In using the device for removing wheels from vehicles, this specific construction possesses certain advantages in that the cap may be screwed on to the same threads of the hub which ordinarily receive the usual hub cap, so that by removing the hub cap the wheel puller cap may be put on in place thereof. In case the device is to be used for removing cams, fly wheels or other similar members from the ends of shafts, spindles or other supports, it is evident that the member 10 instead of being in the form of a cap might be of skeleton formation, or might have hooks or other parts for engaging with the element to be removed instead of having screw threads to screw on to the latter.

The screw 11, as previously stated, extends through the end of the cap 10, and is in direct alinement with the axle 16 which supports the hub and from which it is desired to remove the wheel. In constructions heretofore employed, the screw has been made to directly engage with the end of the axle, so that with the member 10 attached to the hub, the rotation of the screw 11 into engagement with the end of the axle, would slowly force the wheel endwise. In my improved construction, the screw 11 is provided with a central bore or passage preferably also in axial alinement with the axle 16, and in this passage or bore I mount a floating pin 17. The pin is of greater length than the screw and at its inner end may engage with the end of the axle so that by pounding or tapping on the outer end of the pin, the force of the blows may be directly transmitted to the axle.

In removing a wheel the screw 11 is first tightened up so as to apply a strain tending to force the wheel endwise in respect to the axle, and in case the application of a reasonable amount of force in turning the screw does not pull the wheel endwise, blows may be applied to the outer end of the pin which will jar the parts sufficiently to break the rust or loosen the parts which are stuck or wedged together. As the pin is freely movable endwise through the screw at least for a limited distance, it is evident that continual pounding on the pin, does not apply any strain to the threads connecting the two relatively rotatable members 10 and 11. As soon as the parts are jarred loose by tapping on the pin, the screw 11 may again be rotated and further strain applied toward the pulling off of the wheel. The turning of the screw and the tapping on the pin may be carried on alternately or simultaneously until the wheel is entirely removed, although ordinarily after the wheel once has been started, the tapping is no longer necessary.

The pin may be freely removable from the screw or may be permanently attached thereto with a limited endwise movement. Preferably the latter construction is employed and this avoids the liability of losing or misplacing the pin. Instead of providing a special pin the screw may merely have an axial passage through which a short steel rod or other member may act as a plunger, and in place of the floating pin. In Fig. 1, I have shown the pin 17 held in its place by swaging over the ends to form heads 18—18. In Fig. 3, I have shown a pin 17$^a$ having separate portions of different diameters and separated by a shoulder 18$^a$ adapted to engage with a corresponding shoulder within the screw 11$^a$ so as to limit the endwise movement of the pin in one direction. In Fig. 4, I have shown a pin 17$^b$ having a collar 18$^b$ thereon for engagement with a shoulder in screw 11$^b$ so as to limit endwise movement of the screw in the opposite direction. It is of course evident that any other suitable means may be employed for limiting the extent of the free endwise movement of the pin, or that as previously stated, the pin may be freely removable.

Having thus described my invention, what I claim as new and desire to protect by Letters Patent, is:—

1. A wheel puller, including two relatively rotatable members having screw threaded engagement and adapted for engagement with separate elements to effect the relative longitudinal movement of the latter, and a plunger member slidably connected to one of said first-mentioned members and adapted to engage with one of said elements.

2. A wheel puller, including two members, one of said members being adapted for engagement with a wheel or other rotor, and the other of said members being adapted for engagement with the end of an axle or spindle supporting said wheel or rotor, said members being relatively rotatable about an axis in alinement with the axis of said wheel or rotor, and having screw threaded engagement and a third member slidably connected to said last-mentioned member and adapted for engagement with the end of said axle or spindle.

3. A wheel puller, including two members, one of said members being adapted for engagement with a wheel or other rotor, and the other of said members being adapted for engagement with the end of an axle or spindle supporting said wheel or rotor, said members being relatively rotatable about an axis in alinement with the axis of said wheel or rotor, and having screw threaded engagement, and a plunger slidably through said second-mentioned member for engagement with the end of said axle or spindle.

4. A wheel puller, including two members, one of said members being adapted for engagement with a wheel or other rotor, and the other of said members being adapted for engagement with the end of an axle or spindle supporting said wheel, or rotor, said members being relatively rotatable about an axis in alinement with the axis of said wheel or rotor, and having screw threaded engagement, said second-mentioned member having an axially disposed bore or passage therethrough open at both ends and a plunger within said bore or passage and movable lengthwise therein.

5. A wheel puller, including two members, one member being adapted for engagement with a rotor, and the other being adapted for engagement with the end of an axle supporting said rotor, said members being relatively rotatable about an axis in alinement with the axis of said rotor, and having screw threaded engagement, and means independent of said members for applying tapping blows to the end of said axle.

6. A wheel puller, including three members, two of said members having threaded engagement and being relatively rotatable about an axis in alinement with the axis of the wheel to be pulled, the other of said members being slidably mounted within one of the other of said members and adapted to receive tapping blows and apply the force thereof to the end of the axle or spindle supporting said wheel.

7. A wheel puller, including two members, one of said members being adapted for engagement with a wheel or other rotor, and the other of said members being adapted for engagement with the end of an axle or spindle supporting said wheel or rotor, said members being relatively rotatable about an axis in alinement with the axis of said wheel or rotor, and having screw threaded engagement, a third member slidably connected to said last mentioned member and adapted for engagement with the end of said axle or spindle, and means for limiting the longitudinal movement of said third member.

8. A wheel puller, including two members, one of said members being adapted for engagement with a wheel or other rotor, and the other of said members being adapted for engagement with the end of an axle or spindle supporting said wheel or rotor, said members being relatively rotatable about an axis in alinement with the axis of said wheel or rotor, and having screw threaded engagement, a third member slidably connected to said last-mentioned member and adapted for engagement with the end of said axle or spindle, and means for limiting the longitudinal movement of said third member and preventing its removal.

9. A wheel puller, including a cap interiorly threaded for engagement with the end of the hub, a screw extending through the end of said cap, and adapted for engagement with the end of the axle supporting said hub, said screw having a central passage or bore therethrough and a pin having a limited endwise movement through said bore or passage.

Signed at Waltham in the county of Middlesex and State of Massachusetts this twenty-fifth day of August A. D. 1914.

FREDERICK C. HERSEE.

Witnesses:
F. V. STONE,
S. L. COX.